United States Patent [19]

Götz et al.

[11] 4,245,295

[45] Jan. 13, 1981

[54] APPARATUS FOR THE CONTROLLED VOLTAGE SUPPLY OF D.C. DRIVES

[75] Inventors: Georg F. Götz, Bubenreuth; Hans Gross, Neunkirchen, both of Fed. Rep. of Germany

[73] Assignee: Siemens Aktiengesellschaft, Berlin and Munich, Fed. Rep. of Germany

[21] Appl. No.: 944,768

[22] Filed: Sep. 22, 1978

[30] Foreign Application Priority Data

Sep. 23, 1977 [DE] Fed. Rep. of Germany ....... 2742973

[51] Int. Cl.³ ........................................... H02M 7/155
[52] U.S. Cl. ..................................... 363/129; 363/70; 363/87; 363/160
[58] Field of Search ................................. 363/69–70, 363/85, 87, 160–162, 128–129, 65; 307/13, 24, 33–34, 82

[56] References Cited

U.S. PATENT DOCUMENTS

| 3,281,645 | 10/1966 | Spink ..................................... 363/129 |
| 3,579,080 | 5/1971 | Vollrath ................................. 363/70 |
| 4,044,295 | 8/1977 | Ferraiolo et al. ................... 363/87 X |
| 4,074,348 | 2/1978 | Salzmann et al. ..................... 363/160 |
| 4,084,223 | 4/1978 | Gross et al. .......................... 363/129 |

Primary Examiner—William M. Shoop
Assistant Examiner—Peter S. Wong
Attorney, Agent, or Firm—Kenyon & Kenyon

[57] ABSTRACT

Several static frequency changers and control units for controlling the voltage supply of D.C. motors are combined in one equipment, functions common to all frequency changers being contained in a central unit.

1 Claim, 1 Drawing Figure

APPARATUS FOR THE CONTROLLED VOLTAGE SUPPLY OF D.C. DRIVES

BACKGROUND OF THE INVENTION

This invention relates to apparatus for the controlled voltage supply of several D.C. drives, especially machine tool drives, in which each drive is connected via a thyristor frequency changer to a three-phase network and a control unit is associated with each frequency changer. The control unit produces firing pulses for the respective thyristors when its drive signal agrees with line-synchronized sawtooth voltages. Voltage supplies of the above-mentioned type are described, for instance, in German Pat. No. 2,524,869 corresponding to U.S. Pat. No. 4,084,223.

Apparatus for the main spindle and feed drives in machine tools are generally installed as separate units in the control cabinet. Each has a control set, which is fed by specially fitted speed and current controllers. In addition, a separate power supply is provided for each unit.

It is an object of the present invention to reduce the cost in a separate voltage supply of the type mentioned above.

BRIEF SUMMARY OF THE INVENTION

According to the invention, this problem is solved by combining at least two static frequency changers, including control units, in one equipment and by taking the line-synchronized sawtooth voltages from a central unit common to all control units. Preferably, also, the power supply is common to all control units. By thus combining similar functions for several drives, the voltage supply of the motors can be made less expensive.

In addition, combining the mechanical structure and the electrical functions results in a more compact equipment having fewer parts and connections. Furthermore, installation and start-up are simplified. Combining the standardized functions for all control sets also makes possible the use of common functional building blocks such as, for instance, pulse formers, of higher quality and, if necessary, permits use of additional modules in common, such as diagnostic, monitoring and interlock devices for a number of drives.

DETAILED DESCRIPTION OF THE INVENTION

Figure 1:
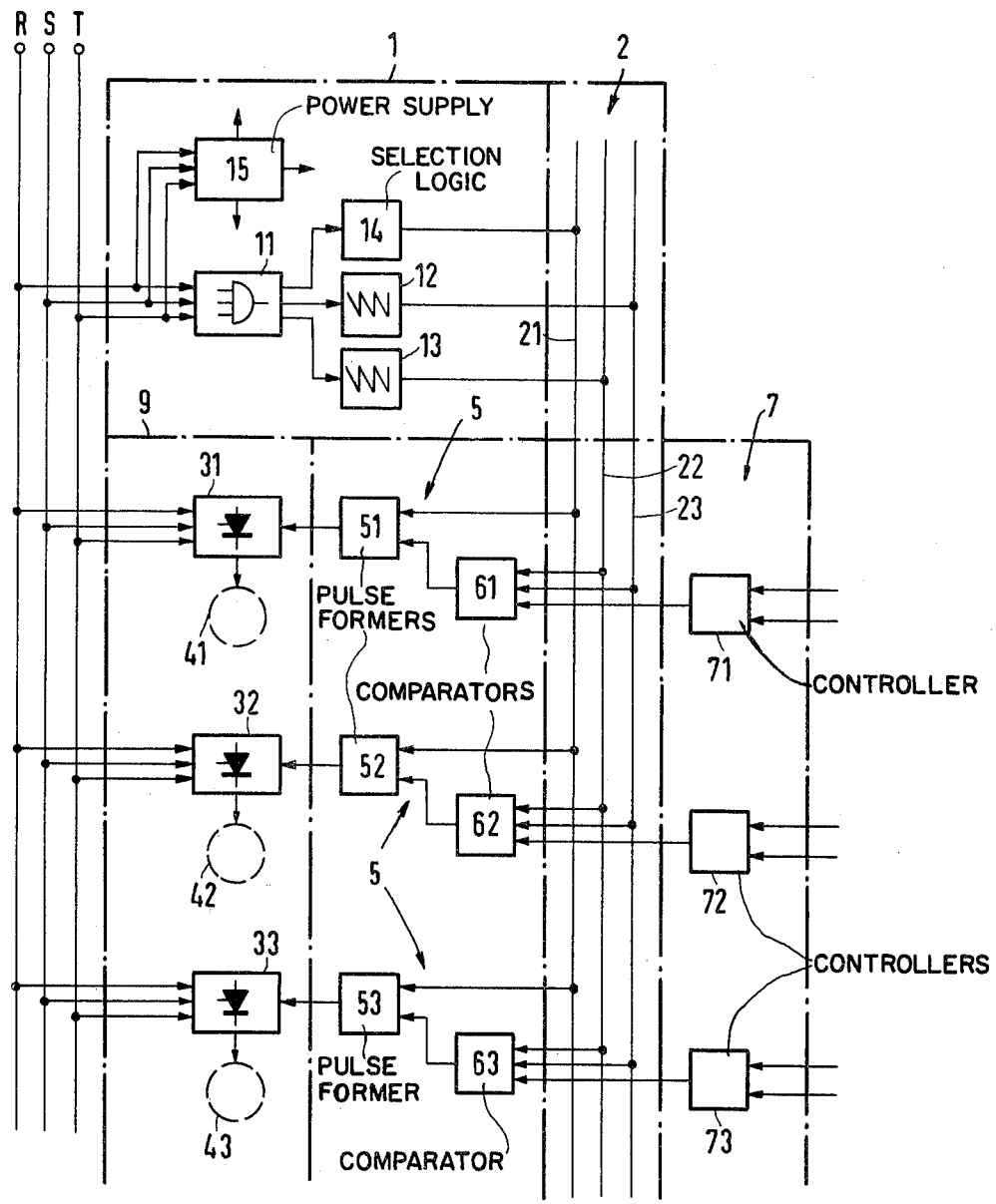
FIG. 1 is a schematic drawing of a controlled voltage supply for several D.C. motors embodying the principles of the invention.

FIG. 1 shows three or more D.C. motors 41, 42, 43 (as dashed circles) which, for instance, are the feed or main drives of a machine tool, being supplied via reversing thyristor converters 31, 32 and 33 from a three-phase network RST. The control operates in such a manner that a sawtooth voltage is started at the beginning of each possible drive region for each thyristor and that a firing pulse associated with the appropriate half-wave is delivered to the thyristors of the static frequency converters when this sawtooth voltage agrees with a control voltage.

For simplification, a central unit 1 is provided for all the frequency changers which contains all functions common to them including, especially, synchronization, formation of the sawtooth, and power supply.

Thus, a logic circuit 11 is connected to the phase voltages RST, and evaluates the polarity and zero crossing times of the phase voltages in which a starting point lying above the rectifier limit and an end point lying below the inverter limit is set in each half-wave of all converters 31, 32 and 33 and the integrator 13 for the thyristors assigned to the positive half-waves of all converters 31 to 33. A circuit of this kind is explained, for instance, in German Pat. No. 2,524,869, and U.S. Pat. No. 4,084,223.

The central unit 1 is further provided with a selection logic circuit 14 which, under control of the evaluation logic circuit 11, activates associated thyristors in the individual converters in accordance with the three-phase system.

The central unit 1 also contains the power supply 15, which is common to all units and furnishes the supply voltage for the individual components. Furthermore, a diagnostic, monitoring and interlock system common to all static frequency changers may be provided in the central unit.

A bus 2 with several conductors is shown, in general, with individual conductors connected to the evaluation logic circuit 11. In particular, bus line 21 is associated with the respective phase voltage for the thyristors and bus lines 22 and 23 are for the sawtooth voltages provided by the integrators 12 and 13. The sawtooth voltages on the lines 22 and 23 are utilized in the pulse generators 5 to form the firing commands for the individual converters. This is accomplished by comparing the control voltages furnished by the individual controllers 71, 72 and 73 of the control 7 with the sawtooth voltage supplied by bus lines 22 and 23 in comparators 61, 62 and 63. If the respective control voltage and the sawtooth voltage agree, then the firing commands for the respective thyristors of the converters 31, 32, 33 are formed in the pulse formers 51, 52 and 53, respectively, in accordance with the signal on the bus line 21.

What is claimed is:
1. An apparatus for providing controlled DC voltage to at least two DC drive motors for machine tools and the like, comprising
   each drive motor being coupled via a thyristor frequency converter to a three-phase supply network and each converter having a control unit,
   a first integrator for providing a sawtooth voltage for controlling the thyristors associated with all negative half-waves of the three phase supply voltages in all the frequency converters,
   a second sawtooth integrator for providing a sawtooth voltage for controlling the thyristors associated with all positive half-waves of the three-phase supply voltages in all the frequency converters,
   a selection logic circuit for phase-dependent release of the thyristors,
   and a multi-conductor bus coupling the integrators and the selection logic circuit to the control units of the converters.

* * * * *